(12) United States Patent
Besshi (10) Patent No.: US 9,841,859 B2
(45) Date of Patent: Dec. 12, 2017

(54) SENSOR STRUCTURE AND DETECTION METHOD (71) Applicant: Panasonic Intellectual Property Management Co., Ltd., Osaka (JP)

(72) Inventor: Takuma Besshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 7 days.

(21) Appl. No.: 14/908,092

(22) PCT Filed: Aug. 19, 2014

(86) PCT No.: PCT/JP2014/004225
§ 371 (c)(1),
(2) Date: Jan. 27, 2016

(87) PCT Pub. No.: WO2015/029376
PCT Pub. Date: Mar. 5, 2015

(65) Prior Publication Data
US 2016/0209956 A1 Jul. 21, 2016

(30) Foreign Application Priority Data
Aug. 26, 2013 (JP) ................................. 2013-174250

(51) Int. Cl.
*G06F 3/044* (2006.01)
*G06F 3/041* (2006.01)
(Continued)

(52) U.S. Cl.
CPC .............. *G06F 3/044* (2013.01); *G06F 3/038* (2013.01); *G06F 3/0338* (2013.01); *G06F 3/0354* (2013.01); *G06F 3/0416* (2013.01)

(58) Field of Classification Search
CPC .............................. G06F 3/044; G06F 3/0416
See application file for complete search history.

(56) References Cited

U.S. PATENT DOCUMENTS

2008/0180390 A1 7/2008 Yoshikawa
2010/0134422 A1* 6/2010 Borras ................ G06F 3/03547
345/173
(Continued)

FOREIGN PATENT DOCUMENTS

JP 2008-134764 6/2008
JP 2011-181057 9/2011
(Continued)

OTHER PUBLICATIONS

International Search Report of PCT application No. PCT/JP2014/004225 dated Nov. 4, 2014.

*Primary Examiner* — Sepehr Azari
(74) *Attorney, Agent, or Firm* — McDermott Will & Emery LLP (57) ABSTRACT A sensor device includes electrodes disposed in a detection region having plural segments such that the electrodes do not overlap each other. The plural segments are arranged in a matrix shape with plural, three or more rows and plural, three or more columns. Each of the electrodes is located on certain segments out of the plural segments. The certain segments are located certain rows out of the plural rows and certain columns out of the plural columns. When each of the segments in the detection region is operated, the electrodes output signals different from each other correspondingly to each of the plural segments. The sensor device can easily detect the operated position with a simple configuration.

8 Claims, 7 Drawing Sheets (51) Int. Cl.
*G06F 3/038* (2013.01)
*G06F 3/0338* (2013.01)
*G06F 3/0354* (2013.01)

(56) References Cited

U.S. PATENT DOCUMENTS

| | | |
|---|---|---|
| 2011/0210936 A1 | 9/2011 | Wang et al. |
| 2012/0001869 A1 | 1/2012 | Ito et al. |
| 2013/0099805 A1 | 4/2013 | Reynolds et al. |
| 2014/0152610 A1* | 6/2014 | Suwald .................... G01D 5/24 345/174 |

FOREIGN PATENT DOCUMENTS

| | | |
|---|---|---|
| JP | 2012-003779 | 1/2012 |
| JP | 2012-014509 | 1/2012 |
| JP | 2013-012019 | 1/2013 |

* cited by examiner

| Electrode / Segment | Segment(s) Contributing to Change of Capacitance of Electrode | | | | Detection Level Obtained at Electrode | | | |
|---|---|---|---|---|---|---|---|---|
| | 31 | 32 | 33 | 34 | 31 | 32 | 33 | 34 |
| A1 | A1,A2 A7 | A1,A6 A7 | None | None | D1 | D1 | 0 | 0 |
| A2 | A1-A3 A7,A8 | A1,A6 A7 | None | None | D2 | D3 | 0 | 0 |
| A3 | A2-A4 A7-A9 | None | None | None | D4 | 0 | 0 | 0 |
| A4 | A3-A5 A8,A9 | None | A5,A9 A10 | None | D2 | 0 | D3 | 0 |
| A5 | A4,A5 A9 | None | A5,A9 A10 | None | D1 | 0 | D1 | 0 |
| A6 | A1,A2 A7 | A1,A6,A7 A11,A12 | None | None | D3 | D2 | 0 | 0 |
| A7 | A1-A3 A7,A8,A13 | A1,A6,A7 A11-A13 | None | None | D5 | D5 | 0 | 0 |
| A8 | A2-A4 A7-A9,A13 | A7,A12 A13 | A9,A13 A14 | None | D6 | D7 | D7 | 0 |
| A9 | A3-A5 A8,A9,A13 | None | A5,A9,A10 A13-A15 | None | D5 | 0 | D5 | 0 |
| A10 | A4,A5 A9 | None | A5,A9,A10 A14,A15 | None | D3 | 0 | D2 | 0 |
| A11 | None | A6,A7,A11 A12,A16,A17 | None | None | 0 | D4 | 0 | 0 |
| A12 | A7,A8 A13 | A6,A7,A16 A11-A13,A17 | None | A13,A17 A18 | D7 | D6 | 0 | D7 |
| A13 | A7-A9 A13 | A7,A12 A13,A17 | A9,A13 A14,A19 | A13 A17-A19 | D8 | D8 | D8 | D8 |
| A14 | A8,A9 A13 | None | A9,A10,A19 A13-A15,A20 | A13,A18 A19 | D7 | 0 | D6 | D7 |
| A15 | None | None | A9,A10,A14 A15,A19,A20 | None | 0 | 0 | D4 | 0 |

FIG. 5B

| Electrode / Segment | Segment(s) Contributing to Change of Capacitance of Electrode | | | | Detection Level Obtained at Electrode | | | |
|---|---|---|---|---|---|---|---|---|
| | 31 | 32 | 33 | 34 | 31 | 32 | 33 | 34 |
| A16 | None | A11,A12,A16 A17,A21 | None | A17,A21 A22 | 0 | D2 | 0 | D3 |
| A17 | None | A11-A13 A16,A17,A21 | None | A13,A17,A18 A21-A23 | 0 | D5 | 0 | D5 |
| A18 | None | A12,A13 A17 | A13,A14 A19 | A13,A17-A19 A22-A24 | 0 | D7 | D7 | D6 |
| A19 | None | None | A13-A15 A19,A20,A25 | A13,A18,A19 A23-A25 | 0 | 0 | D5 | D5 |
| A20 | None | None | A14,A15,A19 A20,A25 | A19 A24,A25 | 0 | 0 | D2 | D3 |
| A21 | None | A16,A17 A21 | None | A17,A21 A22 | 0 | D1 | 0 | D1 |
| A22 | None | A16,A17 A21 | None | A17,A18 A21-A23 | 0 | D3 | 0 | D2 |
| A23 | None | None | None | A17-A19 A22-A24 | 0 | 0 | 0 | D4 |
| A24 | None | None | A19,A20 A25 | A18,A19 A23-A25 | 0 | 0 | D3 | D2 |
| A25 | None | None | A19,A20 A25 | A19,A24 A25 | 0 | 0 | D1 | D1 |

FIG. 6

SENSOR STRUCTURE AND DETECTION METHOD

This application is a U.S. national stage application of the PCT international application No. PCT/JP2014/004225 filed on Aug. 19, 2014, which claims the benefit of foreign priority of Japanese patent application No. 2013-174250 filed on Aug. 26, 2013, the contents all of which are incorporated herein by reference.

TECHNICAL FIELD

The present invention relates to a sensor device mountable to various electronic devices, and a detection method using the sensor device.

BACKGROUND ART

While electronic devices including a capacitive touch panel mounted thereto have recently become widespread, an example thereof includes a mobile communication device, such as a smartphone. Devices other than a mobile communication field have also become widespread. The device is actuated by a predetermined input operation, by mounting a capacitive touch panel to the input operation unit of the device.

Figure 7:
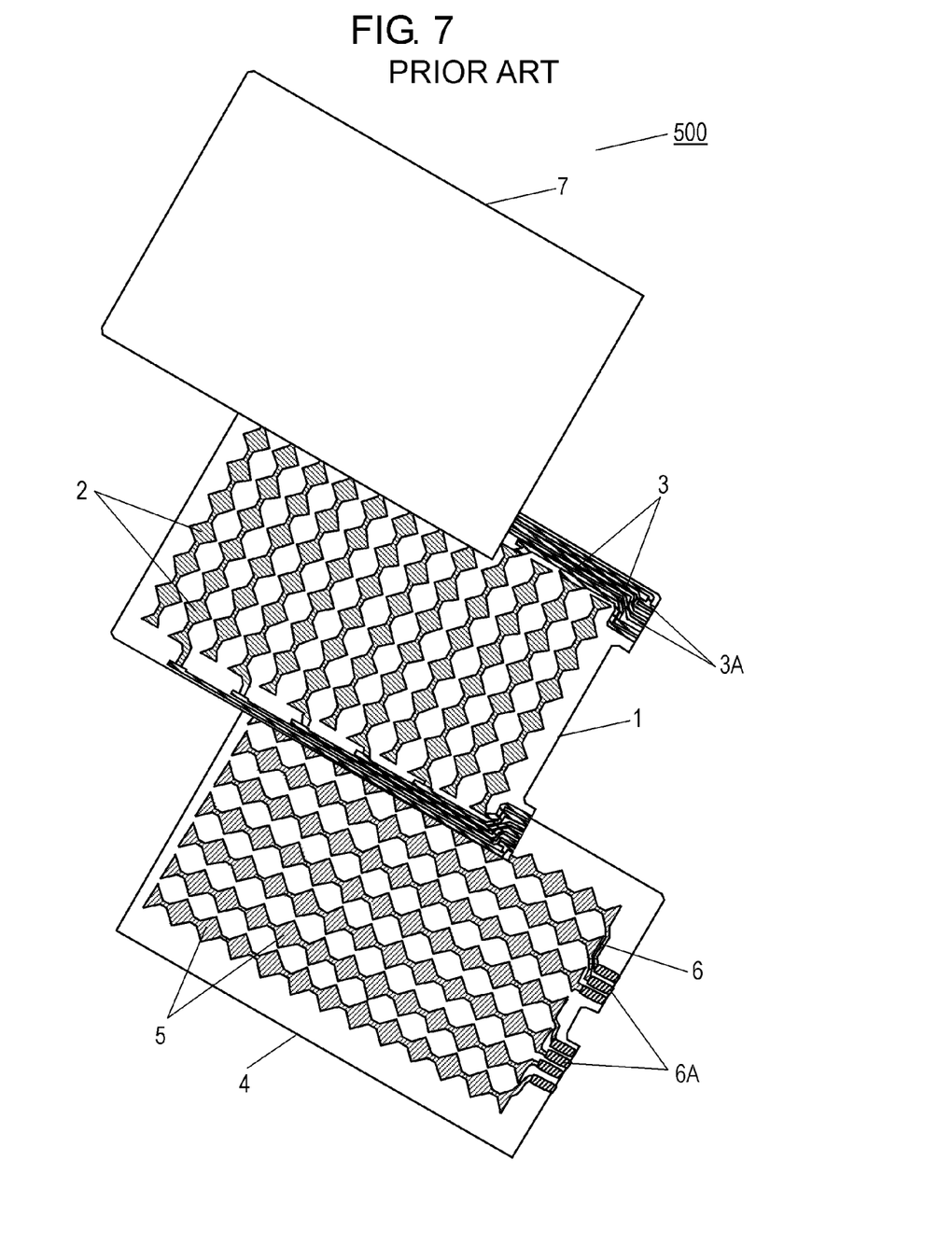
FIG. 7 is an exploded perspective view of a conventional capacitive touch panel.

FIG. 7 is an exploded perspective view of conventional capacitive touch panel 500 disclosed in PTL 1. Capacitive touch panel 500 includes upper substrate 1, upper conductive layers 2 with strip shapes disposed on upper substrate 1, lower conductive layers 5 with strip shapes extending substantially perpendicular to upper conductive layers 2, and lower substrate 4 on which lower conductive layers 5 are formed. Upper substrate 1 is stuck on lower substrate 4 such that upper conductive layers 2 and lower conductive layers 5 are directed upward. Capacitive touch panel 500 further includes cover film 7 for protecting upper conductive layers 2 exposed upward.

Each of upper conductive layers 2 is led via wires 3 disposed on an outer periphery of upper substrate 1, and is connected to respective one of upper electrodes 3A. Each of lower conductive layers 5 is led via wires 6 disposed on an outer periphery of lower substrate 4 and is connected to respective one of lower electrodes 6A.

When the touch panel is in a touch operation state in which a finger or the like touches cover film 7, a capacitance changes locally at the touched position. The change in the capacitance is detected by a controller mounted on a device via conductive layers 2 and 5 and electrodes 3A and 6A, and the operated position is determined. The controller actuates a predetermined function in response to the determination result.

CITATION LIST

Patent Literature

PTL 1: Japanese Patent Laid-Open Publication No. 2013-12019

SUMMARY

A sensor device includes electrodes disposed in a detection region having plural segments such that the electrodes do not overlap each other. The plural segments are arranged in a matrix shape with plural, three or more rows and plural, three or more columns. Each of the electrodes is located on certain segments out of the plural segments. The certain segments are located certain rows out of the plural rows and certain columns out of the plural columns. When each of the segments in the detection region is operated, the electrodes output signals different from each other correspondingly to each of the plural segments.

The sensor device can easily detect the operated position with a simple configuration.

DETAIL DESCRIPTION OF PREFERRED EMBODIMENTS

Figure 1:
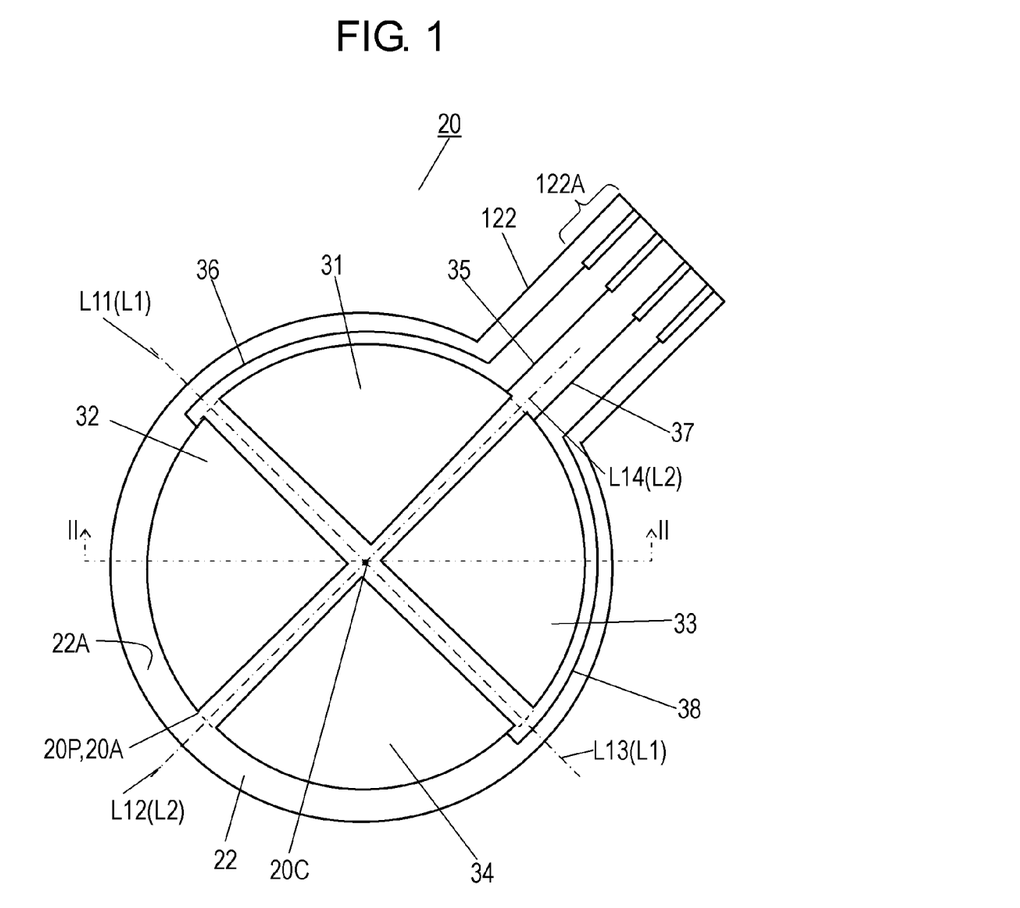
FIG. 1 is a plan view of a sensor device in accordance with an exemplary embodiment.
Figure 2:
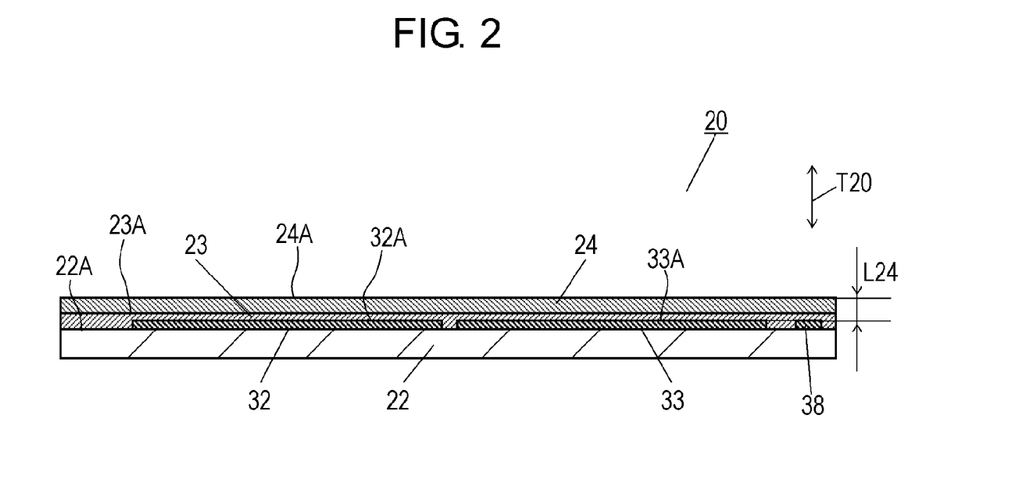
FIG. 2 is a sectional view of the sensor device on line II-II shown in FIG. 1.

FIG. 1 is a plan view of sensor device 20 in accordance with an exemplary embodiment. FIG. 2 is a sectional view of sensor device 20 on line II-II shown in FIG. 1. As shown in FIG. 1, sensor device 20 is a capacitive sensor. Sensor device 20 includes substrate 22 and four electrodes 31 to 34 that are disposed on an upper surface of substrate 22 and are independent of each other. Substrate 22 is made of an insulating material, such as a resin sheet, such as polyethylene terephthalate (PET) or polycarbonate (PC). Electrodes 31 to 34 are made of conductive material, such as silver. As shown in FIG. 2, sensor device 20 further includes insulation resist 23 disposed on upper surface 22A of substrate 22 that covers upper surfaces 31A to 34A of electrodes 31 to 34, and cover 24 disposed on upper surface 23A of insulation resist 23. Cover 24 is made of an insulating material, such as acrylonitrile butadiene styrene (ABS) resin, and has flat upper surface 24A. Cover 24, insulation resist 23, substrate 22, and electrodes 31 to 34 are integrated such that distance L24 from upper surface 24A of cover 24 to each of upper surfaces 31A to 34A of electrodes 31 to 34 in thickness direction T20 is constant. Cover 24 may preferably be previously integrated with insulation resist 23. However, cover 24 may be combined with insulation resist 23 later.

Electrodes 31 to 34 have substantially fan shapes having the same size. The fan shapes are formed by dividing circle 20A having center 20C at an angle interval of about 90 degrees. Electrodes 31 and 32 are separated from each other by line L11 that passes center 20C. Electrodes 32 and 34 are separated from each other by line L12 that is perpendicular to line L11 and passes center 20C. Electrodes 33 and 34 are separated from each other by line L13 that is perpendicular to line L12 and passes center 20C. Electrodes 31 and 33 are separated from each other by line L14 that is perpendicular to lines L11 and L13 and passes center 20C. Lines L11 and L13 extend in the same direction to form one line L1, and lines L12 and L14 extend in the same direction to form one line L2. As shown in FIG. 1, electrodes 31 to 34 are disposed such that circumferences of electrodes 31 to 34 form a circle and upper surfaces 31A to 34A do not overlap each other. According to the embodiment, viewing from above, electrode 31, electrode 32, electrode 34, and electrode 33 are arranged counterclockwise about center 20C in this order. Electrode 31 is disposed in front of center 20C, electrode 32 is disposed on the left of center 20C, electrode 33 is disposed on the right of center 20C, and electrode 34 is disposed at the back of center 20C.

Tail part 122 projects from substrate 22. Wires 35 to 38 are led from electrodes 31 to 34 to tail part 122 along the circumference of upper surface 22A of substrate 22. The tips of wires 35 to 38 are covered with a film for a connection part that is made of, e.g. carbon, and end 122A of tail part 122 is configured to be connected to a connector. Insulation resist 23 also covers wires 35 to 38 except end 122A of tail part 122.

In sensor device 20, circle 20A in which electrodes 31 to 34 are disposed forms detection region 20P. Positions on detection region 20P can be detected.

Figure 3:
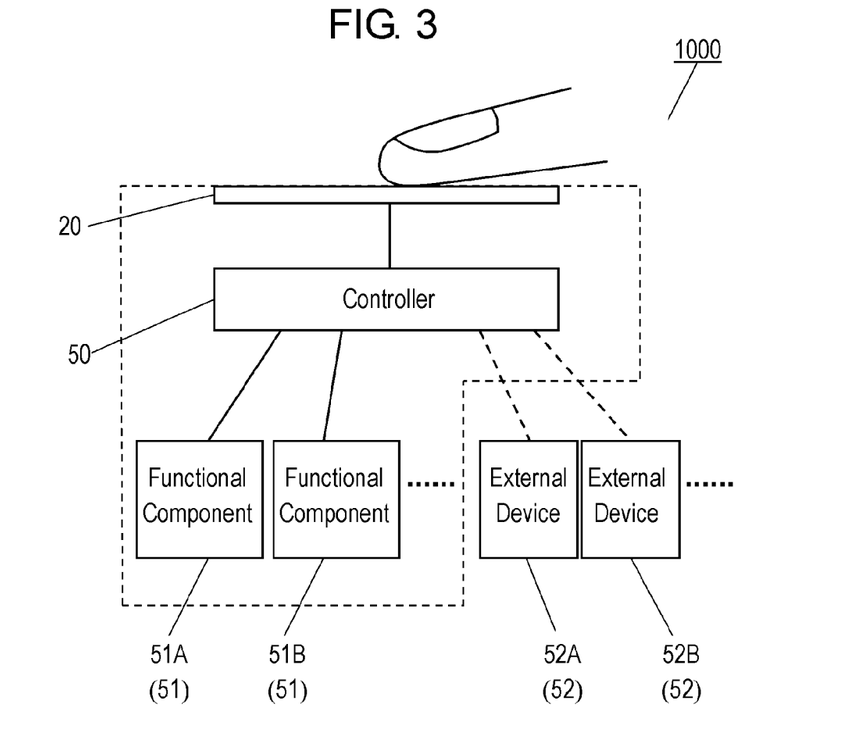
FIG. 3 is a block diagram of an electronic device having the sensor device mounted thereto in accordance with the embodiment.

FIG. 3 is a block diagram of electronic device 1000 having sensor device 20 in accordance with the embodiment mounted thereto. Electronic device 1000 may be a mobile communication device, a data terminal device, home appliances (especially, remote controllers), and an on-vehicle apparatuses or steering switches. Controller 50 of electronic device 1000 detects changes in capacitances of electrodes 31 to 34. Controller 50 controls functional components 51 (51A, 51B, . . . ) and external devices 52 (52A, 52B, . . . ).

When a position on cover 24 in detection region 20P is operated with the touch by, e.g. a finger, the capacitance changes locally at and around the operated position on electrodes 31 to 34 in response to the operation. Controller 50 detects the changes in the capacitances via wires 35 to 38, and determines the operated position.

Sensor device 20 has a simple structure, electrodes 31 to 34 having a simple outer shape arranged on substrate 22 and insulation resist 23 and cover 24 which cover the electrodes from above. Therefore, sensor device 20 can have a thin profile and have cost reduced. Conventional touch panel 500 shown in FIG. 7 has a structure where three substrates are stacked, but sensor device 20 according to the embodiment has a structure where only two members are stacked even including cover 24.

Electronic device 1000 according to the embodiment can detect a moving operation in at least eight directions with sensor device 20. A detection method using sensor device 20 will be described below.

Figure 4:
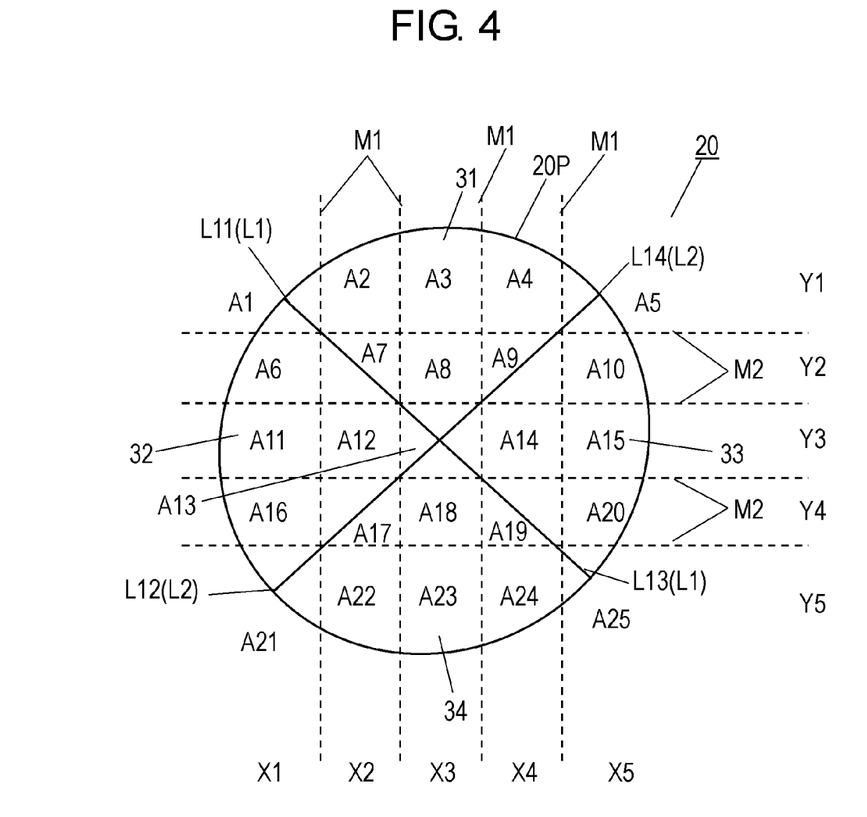
FIG. 4 is a schematic plan view of the sensor device in accordance with the embodiment.

As discussed above, when sensor device 20 is operated with the touch, controller 50 detects changes in the capacitances of electrodes 31 to 34, and performs predetermined calculation processing. Then, controller 50 determines the operated position on sensor device 20 based on the detection levels obtained by the calculation processing. FIG. 4 is a schematic plan view of detection region 20P of sensor device 20. Detection region 20P is virtually divided into 25 segments A1 to A25 that are arranged in a matrix shape with five rows Y1 to Y5 and five columns X1 to X5.

Specifically, as shown in FIG. 4, segments A1 to A5 are virtually arranged laterally from left to right on first row Y1 on the front side. Segments A6 to A10 are virtually arranged laterally from left to right on second row Y2 behind row Y1. Furthermore, segments A11 to A15 are virtually arranged laterally from left to right on third row Y3 behind row Y2. Segment A13 is disposed at center 20C of detection region 20P. Segments A16 to A20 are arranged from left to right on fourth row Y4 behind row Y3. Segments A21 to A25 are virtually arranged from left to right on fifth row Y5 behind row Y4. As shown in FIG. 4, segments A1 to A25 have a square shape, and are separated from each other by plural lines M1 that extend longitudinally in parallel with each other at the same pitches and plural lines M2 that extend laterally in parallel at the same pitch. Lines L1 and L2 separating electrodes 31 to 34 from each other are angled with respect to at least one of lines M1 and M2 separating segments A1 to A25 from each other.

In detection region 20P divided into the segments, the size of segment A13 located at center 20C of detection region 20P is determined. Specifically, segment A13 is located at center 20C of detection region 20P, and has a square shape in which respective predetermined ranges of electrodes 31 to 34 occupy segment A13. The other segments A1 to A12 and A14 to A25 have a square shape arranged around segment A13 in the matrix shape without a clearance in between. Both of the number of rows Y1 to Y5 and the number of columns X1 to X5 of the matrix shape in detection region 20P are odd numbers not smaller than three. Electrodes out of electrodes 31 to 34 adjacent to each other occupy a predetermined range of a segment located on the boundary between the adjacent electrodes, namely in a segment located on at least one of lines L1 and L2. Regarding the shapes and arrangement of electrodes 31 to 34 of sensor device 20 according to the embodiment, segment A13 located at center 20C preferably has a square shape. However, segment A13 may have a rectangular shape or a polygonal shape other than the square shape according to the shapes and arrangement of the electrodes. One of electrodes 31 to 34 is disposed in predetermined ranges in segments out of segments A1 to A25 adjacent to each other.

In sensor device 20, detection region 20P having a circular shape is divided into segments A1 to A25 arranged in a matrix shape with five rows and five columns so as to satisfy the above-mentioned condition.

Electrode 31 is virtually divided into segments A1 to A5, A7 to A9, and A13. Electrode 32 is virtually divided into segments A1, A6, A7, A11 to A13, A16, A17, and A21. Electrode 33 is virtually divided into segments A5, A9, A10, A13 to A15, A19, A20, and A25. Electrode 34 is virtually divided into segments A13, A17 to A19, and A21 to A25.

Figure 5A:
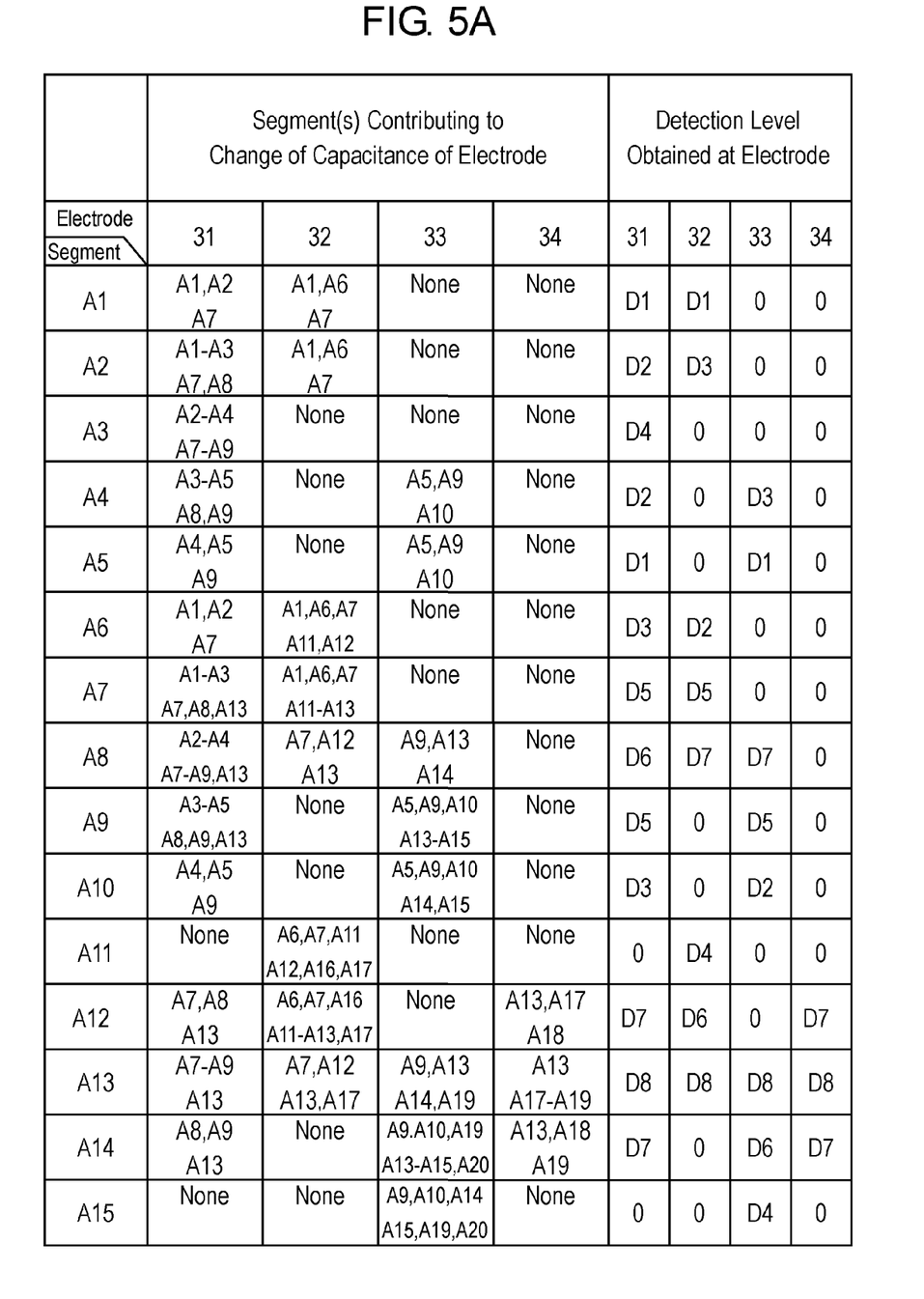
FIG. 5A is a diagram for determining an operated segment of the sensor device in accordance with the embodiment.
Figure 5B:
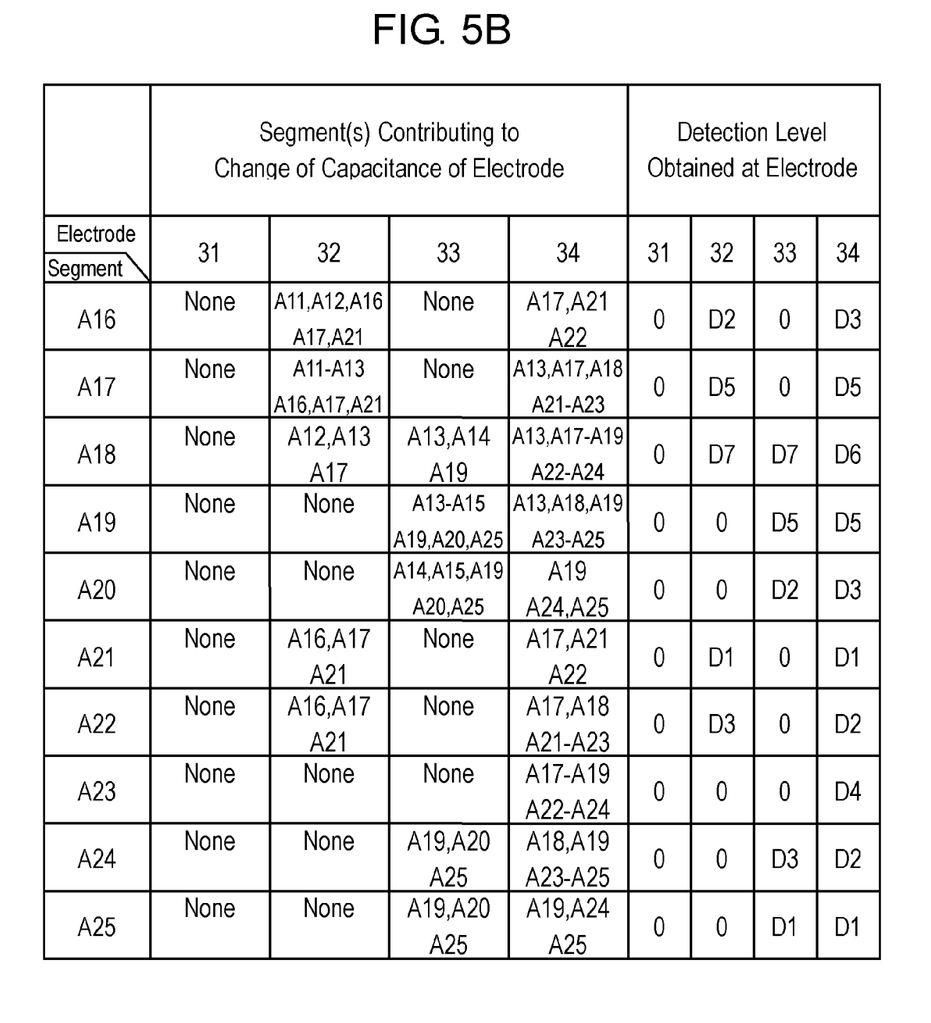
FIG. 5B is another diagram for determining the operated segment of the sensor device in accordance with the embodiment.

Next, the detection method using sensor device 20 will be described below as an operation in which segments on which electrode 31 is disposed are operated. FIGS. 5A and 5B are tables for determining an operated segment of segments A1 to A25 in sensor device 20. These tables show operated segments, segments contributing to the changes in the capacitances of electrodes 31 to 34 caused by the operation on each of the operated segments, and detection levels for electrodes 31 to 34 obtained by the operation on the operated segments.

When segment A1 is operated, the changes in the capacitances of electrodes 31 and 32 are detected, and the changes in the capacitances of electrodes 33 and 34 are not detected.

As shown in FIG. 5A, the change in the capacitance of electrode 31 caused by the operation on segment A1 is detected by controller 50 as change obtained by adding the change in the capacitance in segment A1 to the changes in the capacitances in segments A2 and A7 near and adjacent to segment A1. Changes in the capacitances of electrode 31 in the other segments are not detected. The above-mentioned capacitance and the detection level based on the capacitance are positional information signals associated with the matrix shape. The change in the capacitance is detected and calculated by controller 50. Based on the calculation result, detection level D1 corresponding to the change in the capacitance of electrode 31 is obtained.

The change in the capacitance of electrode 32 caused by the operation on segment A1 is detected by controller 50 as a change obtained by adding the change in the capacitance in segment A1 to the changes in the capacitances in segments A6 and A7 adjacent to segment A1. Changes in the capacitances of electrode 32 in the other segments are not detected. The changes in the capacitances are detected and calculated by controller 50. Based on the calculation result, detection level D1 corresponding to the change in the capacitance is obtained at electrode 32. The number of segments A1, A2, and A7 contributing to the change in the capacitance of electrode 31 caused by the operation on segment A1 and the total area of the segments are the same as the number of segments A1, A6, and A7 contributing to the change in the capacitance of electrode 32 caused by the operation on segment A1 and the total area of the segments, respectively. Therefore, in controller 50, detection levels for electrodes 31 and 32 obtained by the changes in the capacitances of electrodes 31 and 32 are the same detection levels D1.

Segment A1 is away from electrodes 33 and 34, so that the changes in the capacitances of electrodes 33 and 34 are zero, and hence, the predetermined detection levels of them are zero.

In electronic device 1000, controller 50 previously stores, as a table, the detection levels corresponding to the changes in the capacitances of electrodes 31 to 34, and the positions (segments) corresponding to the detection levels for electrodes 31 to 34. The table may include the items in the tables shown in FIG. 5A and FIG. 5B except the item "Segment(s) Contributing to Change of Capacitance of Electrode". Controller 50 determines the operated position (segment) with reference to the table on the basis of the detection levels corresponding to the changes in the capacitances of electrodes 31 to 34.

Specifically, controller 50 determines that segment A1 is operated with reference to the table on the basis of predetermined detection levels D1 of electrodes 31 and 32 that are obtained by the operation on segment A1 and the predetermined detection levels (0) of electrodes 33 and 34. When another segment is operated, controller 50 determines the operated segment with a similar operation with reference to the table on the basis of the changes in the capacitances of electrodes 31 to 34.

When segment A2 is operated, the changes in the capacitances of electrodes 31 and 32 are detected, and the changes in the capacitances of electrodes 33 and 34 are not detected. The change in the capacitance of electrode 31 is detected by controller 50 as detection level D2 obtained by adding the change in the capacitance in segment A2 to the changes in the capacitances in segments A1, A3, A7, and A8 near and adjacent to segment A2. Detection level D2 is higher than predetermined detection level D1. The change in the capacitance of electrode 32 is detected by controller 50 as detection level D3 obtained by summing the changes in the capacitances in segments A1, A6, and A7 near and adjacent to segment A2. Detection level D3 is lower than predetermined detection level D1. Segment A2 is away from electrodes 33 and 34, so that changes in the capacitances of electrodes 33 and 34 caused by the operation on segment A2 are not detected, and hence, the detection levels for electrodes 33 and 34 are zero.

When segment A3 is operated, the change in the capacitance of only electrode 31 is detected, and the changes in the capacitances of electrodes 32 to 34 are not detected. The change in the capacitance of electrode 31 is detected by controller 50 as detection level D4 obtained by adding the change in the capacitance in segment A3 to the changes in the capacitances in segments A2, A4, and A7 to A9 near and adjacent to segment A3. The circumference of detection region 20P has a circular shape, so that the area of the part of electrode 31 that contributes to the change in the capacitance in segment A3 is different from the area of the part of electrode 31 that contributes to the change in the capacitance in segment A2, specifically, larger than the area of the part of electrode 31 that contributes to the change in the capacitance in segment A2. Therefore, detection level D4 obtained by the change in the capacitance of electrode 31 when segment A3 is operated can be higher than detection level D2 obtained by the change in the capacitance of electrode 31 when segment A2 is operated. Therefore, the operations on segments A2 and A3 can be advantageously distinguished from each other accurately.

When segment A4 is operated, the changes in the capacitances of electrodes 31 and 33 are detected, and the changes in the capacitances of electrodes 32 and 34 are not detected. Since the circumference of detection region 20P has a circular shape, similarly to the operation on segment A2, the change in the capacitance of electrode 31 when segment A4 is operated is detected by controller 50 as detection level D2 obtained by adding the change in the capacitance in segment A4 to the changes in the capacitances in segments A3, A5, A8, and A9 near and adjacent to segment A4. The change in the capacitance of electrode 33 when segment A4 is operated is detected by controller 50 as detection level D3 obtained by summing the changes in the capacitances in segments A5, A9, and A10 near and adjacent to segment A4.

The amount of the change in the capacitance of electrode 31 when segment A4 is operated is the same as the amount of the change in the capacitance of electrode 31 when segment A2 is operated, so that the detection levels for electrode 31 in both cases are the same, detection levels D2. However, upon on the detecting that detection level D2 is obtained at electrode 31, controller 50 can determine which of segments A2 and A4 is operated based on the table by determining which of electrodes 33 and 32 provides predetermined detection level D3.

When segment A5 is operated, the changes in the capacitances of electrodes 31 and 33 are detected, instead of electrodes 31 and 32 when segment A1 is operated, and the changes in the capacitances of electrodes 32 and 34 are not detected. When segment A5 is operated, the detection level for electrode 31 is detection level D1, the same level as that when segment A1 is operated. Controller 50 can determine which of segments A1 and A5 is operated based on the table by determining which of electrodes 32 and 33 provides predetermined detection level D1 in addition to electrode 31.

When segment A7 is operated, the changes in the capacitances of electrodes 31 and 32 are detected, and the changes in the capacitances of electrodes 33 and 34 are not detected. The change in the capacitance of electrode 31 is detected by controller 50 as detection level D5 obtained by adding the change in the capacitance in segment A7 to the changes in the capacitances in segments A1, A2, A3, A8, and A13 near and adjacent to segment A7. The change in the capacitance of electrode 32 is detected by controller 50 as detection level D5 obtained by adding the change in the capacitance in segment A7 to the changes in the capacitances in segments A1, A6, A11, A12, and A13 near and adjacent to segment A7.

When segment A8 is operated, the changes in the capacitances of electrodes 31 to 33 are detected, and the change in the capacitance of electrode 34 is not detected. The change in the capacitance of electrode 31 is detected by controller 50 as detection level D6 obtained by adding the change in the capacitance in segment A8 to the changes in the capacitances in segments A2, A3, A4, A7, A9, and A13 near and adjacent to segment A8. The change in the capacitance of electrode 32 is detected by controller 50 as detection level D7 obtained by summing the changes in the capacitances in segments A7, A12, and A13 near and adjacent to segment A8. The change in the capacitance of electrode 33 is detected by controller 50 as detection level D7 obtained by summing the changes in the capacitances in segments A9, A13, and A14 near and adjacent to segment A8. Detection level D7 is higher than predetermined detection level D6. The area of segment A8 is different from that of any of segments A2 to A4.

When segment A9 is operated, detection level D5 due to the change in the capacitance of electrode 31 is detected similarly to the operation on segment A7. Detection level D5 due to the same change as that in the capacitance of electrode 32 caused by the operation on segment A7 is detected at electrode 33 other than electrode 32. The changes in the capacitances of electrodes 32 and 34 are not detected, and hence the detection levels at electrodes 32 and 34 are zero.

When segment A13 is operated, the changes in the capacitances of electrodes 31 to 34 are detected. The change in the capacitance of electrode 31 is detected by controller 50 as detection level D8 obtained by adding the change in the capacitance in segment A13 to the changes in the capacitances in segments A7, A8, and A9 near and adjacent to segment A13. The change in the capacitance of electrode 32 is detected as detection level D8 obtained by adding the change in the capacitance in segment A13 to the changes in the capacitances in segments A7, A12, and A17 near and adjacent to segment A13. The change in the capacitance of electrode 33 is detected as detection level D8 obtained by adding the change in the capacitance in segment A13 to the changes in the capacitances in segments A9, A14, and A19 near and adjacent to segment A13. The change in the capacitance of electrode 34 is detected as detection level D8 obtained by adding the change in the capacitance in segment A13 to the changes in the capacitances in segments A17, A18, and A19 near and adjacent to segment A13.

Thus, when the segments in which electrode 31 is located are operated, the changes in the capacitances of electrodes 31 to 34, namely detection levels D1 to D8, are different from each other. As discussed above, controller 50 previously stores, e.g. as the tables shown in FIGS. 5A and 5B, the correlation between the operated segments and the detection levels at electrodes 31 to 34 corresponding to the change in the capacitances of electrodes 31 to 34. Controller 50 determines the operated segment with reference to the tables based on the detection levels at electrodes 31 to 34. This method allows the touched segment to be easily and rapidly determined. When any one of other electrodes 32 to 34 is touched, similarly to the case of electrode 31, the touched segment can be determined. The number of rows and the number of columns in the matrix shape are an odd number not smaller than three, so that segment A13 at center 20C of detection region 20P can be advantageously detected. In the above-mentioned method, controller 50 determines the touched segment, and performs a predetermined control of functional component 51 and external device 52 in response to the determined segment.

Conventional capacitive touch panel 500 shown in FIG. 7 includes so many components that the touch panel may not have a thin size. Furthermore, the position touch with, e.g. a finger and the moving operation of the finger in the touch state are determined by detecting all of upper conductive layers 2 having strip shapes and upper conductive layers 5 having strip shapes. Therefore, the touched position and the all-around moving direction can be detected accurately. However, touch panel 500 requires upper conductive layers 2 having strip shapes and upper conductive layers 5 having strip shapes overlapping one another, and upper electrodes 3A and lower electrodes 6A corresponding to the layers, hence increasing the cost thereof. Furthermore, the shapes of the layers and electrodes are essentially restricted to rectangular shapes, hence preventing the touch panel from having shapes other than the rectangular shapes.

In sensor device 20 according to the embodiment, even when the finger is moved while touching the panel, the moving operation can be determined.

For example, when the finger touches segment A8 and then moves to segment A3 while the finger contacts sensor device 20, the state where the touch operation on segment A8 is determined changes over time to the state where a touch operation on segment A3 is determined. In other words, the determined position (segment) changes over time. Therefore, controller 50 can determine that a forward moving operation from segment A8 to segment A3 is performed. When a moving operation between plural electrodes out of electrodes 31 to 34 is performed, the controller can determine the operated segments. Similarly, controller 50 can determine a moving operation in the lateral or backward direction, and also determine a moving operation at an angle of 45 degrees. Thus, sensor device 20 according to the embodiment can easily determine moving operations in eight directions. Based on the determination result, controller 50 performs a predetermined control of corresponding functional component 51 and external device 52.

In this detection method, even in the case that sensor device 20 is thin and inexpensive and includes four electrodes 31 to 34, the operated position can be easily detected by detecting the changes in the capacitances of four electrodes 31 to 34 and performing predetermined processing, and a moving operation in eight directions can be detected.

Sensor device 20 according to the embodiment includes four electrodes 31 to 34 having fan shapes, and can identify twenty five segments A1 to A25 separated virtually. The number of electrodes and the number of segments may be other numbers.

Figure 6:
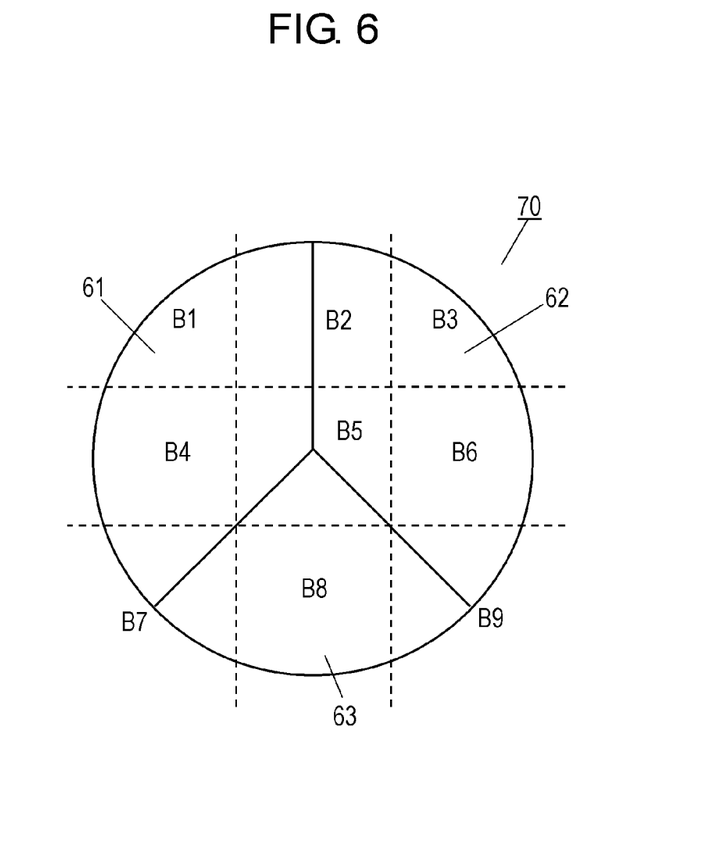
FIG. 6 is a schematic plan view of another sensor device in accordance with the embodiment.

FIG. 6 is a schematic plan view of another sensor device 70 in accordance with the embodiment. In FIG. 6, components identical to those of sensor device 20 shown in FIGS. 1 to 4 are denoted by the same reference numerals. Sensor device 70 includes three electrodes 61 to 63 instead of four electrodes 31 to 34 of sensor device 20 shown in FIG. 4. Three electrodes 61 to 63 are disposed in detection region 20P having a circular shape having center 20C. Electrodes 61 to 63 have substantially fan shapes having the same size. The fan shapes are formed by dividing circle 20A having center 20C at an angle interval of about 120 degrees about center 20C. As shown in FIG. 6, detection region 20P is virtually divided into nine segments B1 to B9 arranged in a matrix shape with three rows and three columns. In an electronic device including sensor device 70, controller 50 previously stores, as a table, the detection levels at electrodes 61 to 63 corresponding to touch operations on segments B1 to B9. Thus, similarly to sensor device 20, by obtaining the detection levels as the changes in the capacitances of electrodes 61 to 63, sensor device 70 can determine a touched segment out of segments B1 to B9 and detect movements in eight directions.

The sensor device according to the embodiment may include, instead of electrodes 31 to 34, five electrodes having fan shapes disposed in a detection region having a circular shape having center 20C. In this case, detection region 20P may be preferably divided into twenty five segments arranged in a matrix shape with five rows Y1 to Y5 and five columns X1 to X5.

The sensor device according to the embodiment may include, instead of electrodes 31 to 34, one electrode disposed at center 20C of detection region 20P and four electrodes that are disposed in an annular shape about the one electrode to surround the one electrode. In this case detection region 20P is preferably divided virtually into twenty five segments A1 to A25 that are arranged in a matrix shape with five rows Y1 to Y5 and five columns X1 to X5.

The sensor device of the exemplary embodiment may include, instead of electrodes 31 to 34, eight electrodes having fan shapes disposed in detection region 20P having a circular shape having center 20C. In this case, detection region 20P is preferably divided into forty nine segments that are arranged in a matrix shape with seven rows and seven columns.

The outer shape of detection region 20P of each of sensor devices 20 and 70 is preferably substantially a circular shape. The outer shape of detection region 20P may be an elliptical shape other than the circular shape. In this case, the outer shape of each electrode is an elliptical arc shape. The shape of each electrode may be a shape other than the fan shape.

Both of the number of rows and the number of columns in the matrix shape formed of the segments obtained by virtually dividing detection region 20P are an odd number not smaller than three. If it is not required that the center of a segment is located at center 20C of detection region 20P, the number of rows and the number of columns of the matrix shape may be an even number. Furthermore, the number of rows and the number of columns of the matrix shape may be different from each other.

Each of sensor devices 20 and 70 may include an actuator disposed on cover 24. The sensor device according to the embodiment may be operated with the actuator other than a finger as long as the capacitances of the electrodes change.

Each of sensor devices 20 and 70 may be disposed on a display screen of a display device, such as a liquid crystal display.

As discussed above, sensor device 20 includes plural electrodes 31 to 34. The electrodes 31 to 34 are disposed in detection region 20P divided into segments A1 to A25 such that electrodes 31 to 34 do not overlap one another. Segments A1 to A25 are arranged in a matrix shape with plural rows Y1 (not fewer than three rows) to Y5 and plural columns X1 to X5 not fewer than three columns) Each of the electrodes 31 to 34 is located on plural certain segments out of the segments A1 to A25. The certain segments are located at plural certain rows Y1 to Y5 out of the rows Y1 to Y5 and plural certain columns out of the columns X1 to X5. In sensor device 20 according to the embodiment, electrode 31 is located on plural certain segments A1 to A5, A7 to A9, and A13 out of the segments A1 to A25. The certain segments are located at plural certain rows Y1 to Y3 out of the plurality of rows Y1 to Y5 and plural certain columns X1 to X5 out of the plurality of columns X1 to X5. Electrode 32 is located on plural certain segments A1, A6, A7, A11 to A13, A16, A17, and A21 out of the plurality of segments A1 to A25. The certain segments are located at plural certain rows Y1 to Y5 out of the rows Y1 to Y5 and plural certain columns X1 to X3 out of the columns X1 to X5. Electrode 33 is located on plural certain segments A5, A9, A10, A13 to A15, A19, A20, and A25 out of the segments A1 to A25. The certain segments are located at plural certain rows Y1 to Y5 out of the rows Y1 to Y5 and plural certain columns X3 to X5 out of the columns X1 to X5. Electrode 34 is located on plural certain segments A13, A17 to A19, A21 to A25 out of the segments A1 to A25. The certain segments are located at plurality of certain rows Y3 to Y5 out of the plurality of rows Y1 to Y5 and plural certain columns X1 to X5 out of the plurality of columns X1 to X5. When segments A1 to A25 in detection region 20P are operated, electrodes 31 to 34 output signals different from one another correspondingly to respective ones of segments A1 to A25.

In the detection method using sensor device 20, one of the plurality of segments A1 to A25 in detection region 20P is operated, and positional information signals are acquired from the electrodes 31 to 34. Based on the acquired positional information signals, one segment of the segments A1 to A25 which is operated is determined.

According to the embodiment, terms, such as "upper surface" and "upward", indicating directions indicate relative directions determined by the relative positional relationship between components, such as substrate 22 and electrodes 31 to 34, of sensor device 20, and do not indicate absolute directions, such as a vertical direction.

INDUSTRIAL APPLICABILITY

A sensor device according to the present invention can easily detect an operated position with a simple configuration, and is useful for various electronic devices.

REFERENCE MARKS IN THE DRAWINGS 20, 70 sensor device
20P detection region
31-34 electrode
61-63 electrode
controller
A1-A25 segment

The invention claimed is:
1. A sensor device comprising:
a plurality of electrodes disposed in a detection region, wherein:
the plurality of electrodes do not overlap each other,
a plurality of virtual segments are defined over the plurality of electrodes,
the plurality of virtual segments are virtually arranged in a matrix shape with a plurality of rows not fewer than three rows and a plurality of columns not fewer than three columns,
each of the plurality of electrodes has an area larger than an area of any of the plurality of virtual segments, and
each of the plurality of electrodes overlaps a plurality of certain segments out of the plurality of virtual segments, the plurality of certain segments being included in a plurality of certain rows out of the plurality of rows and a plurality of certain columns out of the plurality of columns; and
a controller storing a table, wherein:
the table includes direct relationships between each of the plurality of virtual segments and detection levels obtained at the plurality of electrodes, the detection levels being different for each of the plurality of virtual segments, and when one of the plurality of virtual segments in the detection region is operated, the controller obtains one or more signals from the plurality of electrodes and determines the one of the plurality of virtual segments by using the relationships in the table.

2. The sensor device according to claim 1, wherein a line separating the plurality of electrodes inclines with respect to at least one of a plurality of lines separating the plurality of virtual segments.

3. The sensor device according to claim 1, wherein one of the plurality of electrodes occupies respective predetermined ranges segments out of the plurality of virtual segments adjacent to each other.

4. The sensor device according to claim 1, wherein an outer circumference of the detection region includes an arcuate shape.

5. The sensor device according to claim 1, wherein the number of the plurality of rows is an odd number while the number of the plurality of columns is an odd number.

6. The sensor device according to claim 1, wherein at least one of the plurality of virtual segments overlaps with two of the plurality of electrodes.

7. The sensor device according to claim 1, wherein a line separating the plurality of electrodes inclines with respect to any of a plurality of lines separating the plurality of virtual segments.

8. A detection method using a sensor device, the sensor device comprising:

a plurality of electrodes disposed in a detection region, wherein:

the plurality of electrodes do not overlap each other, a plurality of virtual segments are defined over the plurality of electrodes, the plurality of virtual segments are virtually arranged in a matrix shape with a plurality of rows not fewer than three rows and a plurality of columns not fewer than three columns, each of the plurality of electrodes has an area larger than an area of any of the plurality of virtual segments, and each of the plurality of electrodes overlaps a plurality of certain segments out of the plurality of virtual segments, the plurality of certain segments being included in a plurality of certain rows out of the plurality of rows and a plurality of certain columns out of the plurality of columns; and a controller storing a table, wherein the table includes direct relationships between each of the plurality of virtual segments and detection levels obtained at the plurality of electrodes, the detection levels being different for each of the plurality of segments, the method comprising:

obtaining a positional information signal from the plurality of electrodes when one segment out of the plurality of virtual segments in the detection region is operated; and determining the operated one segment out of the plurality of virtual segments by using the obtained positional information signal and the relationship in the table.

* * * * *